(12) United States Patent
Messer (10) Patent No.: US 8,938,465 B2
(45) Date of Patent: Jan. 20, 2015

(54) METHOD AND SYSTEM FOR UTILIZING PACKAGED CONTENT SOURCES TO IDENTIFY AND PROVIDE INFORMATION BASED ON CONTEXTUAL INFORMATION

(75) Inventor: Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 215 days.

(21) Appl. No.: 12/544,994

(22) Filed: Aug. 20, 2009

(65) Prior Publication Data

US 2010/0070895 A1 Mar. 18, 2010

Related U.S. Application Data

(60) Provisional application No. 61/095,922, filed on Sep. 10, 2008.

(51) Int. Cl.
*G06F 17/30* (2006.01)
*G06F 3/00* (2006.01)
*G06F 17/28* (2006.01)

(52) U.S. Cl.
CPC ............ *G06F 17/30528* (2013.01); *G06F 3/00* (2013.01); *G06F 17/28* (2013.01)
USPC ........... 707/766; 707/706; 707/758; 707/767; 707/769; 707/779; 715/700; 715/748; 704/7

(58) Field of Classification Search
CPC ............ G06F 17/30; G06F 3/00; G06F 17/28
USPC ................... 707/708, 726, E17.014, 999.001, 707/705–706, 754, 758, 759–763, 766, 767, 707/769, 770–771, 779, 805; 715/764, 700, 715/715, 748, 752; 704/7–10
See application file for complete search history.

(56) References Cited

U.S. PATENT DOCUMENTS

| | | | |
|---|---|---|---|
| 5,616,876 | A | 4/1997 | Cluts |
| 5,790,935 | A | 8/1998 | Payton |
| 5,918,223 | A | 6/1999 | Blum et al. |
| 5,974,406 | A | 10/1999 | Bisdikian et al. |

(Continued)

FOREIGN PATENT DOCUMENTS

| | | |
|---|---|---|
| CN | 1393107 | 1/2003 |
| CN | 1585947 | 2/2005 |

(Continued)

OTHER PUBLICATIONS

Zhuang, Y. et al., "Applying semantic association to support content-based video retrieval," Oct. 1998, International workshop on Very Low Bitrate Video Coding (VLBV 1998), United States.

(Continued)

*Primary Examiner* — Srirama Channavajjala
(74) *Attorney, Agent, or Firm* — Kenneth L. Sherman, Esq.; Michael Zarrabian, Esq.; Sherman & Zarrabian LLP (57) ABSTRACT

A method and system for providing access to content on an electronic device is provided. One embodiment includes receiving contextual information and querying a packaged content source for content related to the contextual information. Available content relating to the contextual information from the packaged content source is then indicated for user access.

23 Claims, 5 Drawing Sheets

(56) References Cited

U.S. PATENT DOCUMENTS

| | | |
|---|---|---|
| 5,983,214 A | 11/1999 | Lang et al. |
| 5,983,237 A | 11/1999 | Jain et al. |
| 5,995,959 A | 11/1999 | Friedman et al. |
| 6,151,603 A | 11/2000 | Wolfe |
| 6,253,238 B1 | 6/2001 | Lauder et al. |
| 6,334,127 B1 | 12/2001 | Bieganski et al. |
| 6,412,073 B1 | 6/2002 | Rangan |
| 6,438,579 B1 | 8/2002 | Hosken |
| 6,480,844 B1 | 11/2002 | Cortes et al. |
| 6,564,210 B1 | 5/2003 | Korda et al. |
| 6,564,213 B1 | 5/2003 | Ortega et al. |
| 6,601,061 B1 | 7/2003 | Holt et al. |
| 6,637,028 B1 | 10/2003 | Voyticky et al. |
| 6,665,658 B1 | 12/2003 | DaCosta et al. |
| 6,721,748 B1 | 4/2004 | Knight et al. |
| 6,766,523 B2 | 7/2004 | Herley |
| 6,774,926 B1 | 8/2004 | Ellis et al. |
| 6,807,675 B1 | 10/2004 | Maillard et al. |
| 6,826,512 B2 | 11/2004 | Dara-Abrams et al. |
| 6,834,284 B2 | 12/2004 | Acker et al. |
| 6,842,877 B2 | 1/2005 | Robarts |
| 6,954,755 B2 | 10/2005 | Reisman |
| 6,981,040 B1 | 12/2005 | Konig et al. |
| 7,013,300 B1 | 3/2006 | Taylor |
| 7,028,024 B1 | 4/2006 | Kommers et al. |
| 7,054,875 B2 | 5/2006 | Keith, Jr. |
| 7,062,561 B1 | 6/2006 | Reisman |
| 7,069,575 B1 | 6/2006 | Goode et al. |
| 7,110,998 B1 | 9/2006 | Bhandari et al. |
| 7,158,961 B1 | 1/2007 | Charikar |
| 7,158,986 B1 | 1/2007 | Oliver et al. |
| 7,162,473 B2 | 1/2007 | Dumais et al. |
| 7,165,080 B2 | 1/2007 | Kotcheff et al. |
| 7,181,438 B1 | 2/2007 | Szabo |
| 7,194,460 B2 | 3/2007 | Komamura |
| 7,203,940 B2 | 4/2007 | Barmettler et al. |
| 7,225,187 B2 | 5/2007 | Dumais et al. |
| 7,283,992 B2 | 10/2007 | Liu et al. |
| 7,284,202 B1 | 10/2007 | Zenith |
| 7,343,365 B2 | 3/2008 | Farnham et al. |
| 7,363,294 B2 | 4/2008 | Billsus et al. |
| 7,386,542 B2 | 6/2008 | Maybury et al. |
| 7,389,224 B1 | 6/2008 | Elworthy |
| 7,389,307 B2 | 6/2008 | Golding |
| 7,433,935 B1 | 10/2008 | Obert |
| 7,483,921 B2 | 1/2009 | Tsuzuki et al. |
| 7,552,114 B2 | 6/2009 | Zhang et al. |
| 7,565,345 B2 | 7/2009 | Bailey et al. |
| 7,577,718 B2 | 8/2009 | Slawson et al. |
| 7,593,921 B2 | 9/2009 | Goronzy et al. |
| 7,603,349 B1 | 10/2009 | Kraft et al. |
| 7,613,736 B2 | 11/2009 | Hicken |
| 7,617,176 B2 | 11/2009 | Zeng et al. |
| 7,634,461 B2 | 12/2009 | Oral et al. |
| 7,657,518 B2 | 2/2010 | Budzik et al. |
| 7,685,192 B1 | 3/2010 | Scofield et al. |
| 7,716,158 B2 | 5/2010 | McConnell |
| 7,716,199 B2 | 5/2010 | Guha |
| 7,725,486 B2 | 5/2010 | Tsuzuki et al. |
| 7,793,326 B2 | 9/2010 | McCoskey |
| 7,899,915 B2 | 3/2011 | Reisman |
| 8,028,323 B2 | 9/2011 | Weel |
| 8,090,606 B2 | 1/2012 | Svendsen |
| 2001/0003214 A1 | 6/2001 | Shastri et al. |
| 2001/0023433 A1 | 9/2001 | Natsubori et al. |
| 2002/0002899 A1 | 1/2002 | Gjerdingen et al. |
| 2002/0022491 A1 | 2/2002 | McCann et al. |
| 2002/0026436 A1 | 2/2002 | Joory |
| 2002/0032693 A1 | 3/2002 | Chiou et al. |
| 2002/0087535 A1 | 7/2002 | Kotcheff et al. |
| 2002/0147628 A1 | 10/2002 | Specter et al. |
| 2002/0161767 A1 | 10/2002 | Shapiro et al. |
| 2002/0162121 A1 | 10/2002 | Mitchell |
| 2003/0009537 A1 | 1/2003 | Wang |
| 2003/0028889 A1 | 2/2003 | McCoskey |
| 2003/0033273 A1 | 2/2003 | Wyse |
| 2003/0070061 A1* | 4/2003 | Wong et al. ............... 712/220 |
| 2003/0088553 A1 | 5/2003 | Monteverde et al. |
| 2003/0105682 A1 | 6/2003 | Dicker et al. |
| 2003/0131013 A1 | 7/2003 | Pope et al. |
| 2003/0158855 A1 | 8/2003 | Farnham et al. |
| 2003/0172075 A1 | 9/2003 | Reisman |
| 2003/0184582 A1 | 10/2003 | Cohen |
| 2003/0221198 A1 | 11/2003 | Sloo |
| 2003/0229900 A1 | 12/2003 | Reisman |
| 2003/0231868 A1 | 12/2003 | Herley |
| 2004/0031058 A1 | 2/2004 | Reisman |
| 2004/0073944 A1 | 4/2004 | Booth |
| 2004/0107821 A1 | 6/2004 | Alcalde et al. |
| 2004/0194141 A1 | 9/2004 | Sanders |
| 2004/0220925 A1 | 11/2004 | Liu et al. |
| 2004/0244038 A1 | 12/2004 | Utsuki et al. |
| 2004/0249790 A1 | 12/2004 | Komamura |
| 2005/0004910 A1 | 1/2005 | Trepess |
| 2005/0137996 A1 | 6/2005 | Billsus et al. |
| 2005/0144158 A1 | 6/2005 | Capper et al. |
| 2005/0154711 A1 | 7/2005 | McConnell |
| 2005/0160460 A1 | 7/2005 | Fujiwara et al. |
| 2005/0177555 A1 | 8/2005 | Alpert et al. |
| 2005/0240580 A1 | 10/2005 | Zamir et al. |
| 2005/0246726 A1 | 11/2005 | Labrou et al. |
| 2005/0278362 A1 | 12/2005 | Maren et al. |
| 2005/0289599 A1 | 12/2005 | Matsura et al. |
| 2006/0026013 A1* | 2/2006 | Kraft ............................ 705/1 |
| 2006/0026152 A1 | 2/2006 | Zeng et al. |
| 2006/0028682 A1 | 2/2006 | Haines |
| 2006/0036593 A1 | 2/2006 | Dean et al. |
| 2006/0066573 A1 | 3/2006 | Matsumoto |
| 2006/0074883 A1 | 4/2006 | Teevan et al. |
| 2006/0084430 A1 | 4/2006 | Ng |
| 2006/0095415 A1 | 5/2006 | Sattler et al. |
| 2006/0129533 A1* | 6/2006 | Purvis ............................ 707/3 |
| 2006/0133391 A1 | 6/2006 | Kang et al. |
| 2006/0136670 A1 | 6/2006 | Brown et al. |
| 2006/0156252 A1 | 7/2006 | Sheshagiri et al. |
| 2006/0156326 A1 | 7/2006 | Goronzy et al. |
| 2006/0161542 A1 | 7/2006 | Cucerzan et al. |
| 2006/0184515 A1 | 8/2006 | Goel et al. |
| 2006/0195362 A1 | 8/2006 | Jacobi et al. |
| 2006/0210157 A1 | 9/2006 | Agnihotri et al. |
| 2006/0242283 A1 | 10/2006 | Shaik et al. |
| 2007/0038601 A1 | 2/2007 | Guha et al. |
| 2007/0038934 A1* | 2/2007 | Fellman ....................... 715/700 |
| 2007/0043703 A1 | 2/2007 | Bhattacharya et al. |
| 2007/0050346 A1 | 3/2007 | Goel et al. |
| 2007/0061222 A1 | 3/2007 | Allocca et al. |
| 2007/0061352 A1 | 3/2007 | Dimitrova et al. |
| 2007/0073894 A1 | 3/2007 | Erickson et al. |
| 2007/0078822 A1 | 4/2007 | Cucerzan et al. |
| 2007/0101291 A1* | 5/2007 | Forstall et al. ............. 715/805 |
| 2007/0107019 A1 | 5/2007 | Romano et al. |
| 2007/0130585 A1 | 6/2007 | Perret et al. |
| 2007/0143266 A1 | 6/2007 | Tang et al. |
| 2007/0156447 A1 | 7/2007 | Kim et al. |
| 2007/0179776 A1 | 8/2007 | Segond et al. |
| 2007/0198485 A1 | 8/2007 | Ramer et al. |
| 2007/0198500 A1 | 8/2007 | Lucovsky et al. |
| 2007/0208755 A1 | 9/2007 | Bhatkar et al. |
| 2007/0209013 A1* | 9/2007 | Ramsey et al. ............. 715/769 |
| 2007/0214123 A1 | 9/2007 | Messer et al. |
| 2007/0214488 A1 | 9/2007 | Nguyen et al. |
| 2007/0220037 A1 | 9/2007 | Srivastava et al. |
| 2007/0233287 A1 | 10/2007 | Sheshagiri et al. |
| 2007/0300078 A1 | 12/2007 | Ochi et al. |
| 2008/0040316 A1 | 2/2008 | Lawrence |
| 2008/0040426 A1* | 2/2008 | Synstelien et al. ............. 709/203 |
| 2008/0082627 A1* | 4/2008 | Allen et al. ................. 709/217 |
| 2008/0082744 A1 | 4/2008 | Nakagawa |
| 2008/0097982 A1 | 4/2008 | Gupta et al. |
| 2008/0114751 A1 | 5/2008 | Cramer et al. |
| 2008/0133501 A1 | 6/2008 | Andersen et al. |
| 2008/0133504 A1 | 6/2008 | Messer et al. |
| 2008/0162651 A1 | 7/2008 | Madnani |
| 2008/0162731 A1 | 7/2008 | Kauppinen et al. |

(56) References Cited

U.S. PATENT DOCUMENTS

| | | | |
|---|---|---|---|
| 2008/0183596 A1 | 7/2008 | Nash et al. | |
| 2008/0183681 A1 | 7/2008 | Messer et al. | |
| 2008/0183698 A1 | 7/2008 | Messer et al. | |
| 2008/0204595 A1 | 8/2008 | Rathod et al. | |
| 2008/0208839 A1 | 8/2008 | Sheshagiri et al. | |
| 2008/0222232 A1* | 9/2008 | Allen et al. | 709/201 |
| 2008/0229240 A1* | 9/2008 | Garbow et al. | 715/810 |
| 2008/0235209 A1 | 9/2008 | Rathod et al. | |
| 2008/0235393 A1 | 9/2008 | Kunjithapatham et al. | |
| 2008/0242279 A1 | 10/2008 | Ramer et al. | |
| 2008/0250010 A1 | 10/2008 | Rathod et al. | |
| 2008/0256460 A1* | 10/2008 | Bickmore | 715/752 |
| 2008/0266449 A1 | 10/2008 | Rathod et al. | |
| 2008/0288641 A1 | 11/2008 | Messer et al. | |
| 2008/0294998 A1* | 11/2008 | Pyhalammi et al. | 715/748 |
| 2009/0029687 A1 | 1/2009 | Ramer et al. | |
| 2009/0044144 A1* | 2/2009 | Morris | 715/804 |
| 2009/0055393 A1 | 2/2009 | Messer et al. | |
| 2009/0064017 A1* | 3/2009 | Biniak et al. | 715/764 |
| 2009/0070184 A1 | 3/2009 | Svendsen | |
| 2009/0077052 A1 | 3/2009 | Farrelly | |
| 2009/0077065 A1 | 3/2009 | Song et al. | |
| 2009/0094339 A1* | 4/2009 | Allen et al. | 709/206 |
| 2009/0112848 A1 | 4/2009 | Kunjithapatham et al. | |
| 2009/0119717 A1 | 5/2009 | Newton et al. | |
| 2009/0248883 A1* | 10/2009 | Suryanarayana et al. | 709/229 |
| 2009/0288014 A1* | 11/2009 | Fujioka | 715/745 |
| 2010/0070895 A1 | 3/2010 | Messer | |
| 2010/0191619 A1 | 7/2010 | Dicker et al. | |
| 2010/0257196 A1* | 10/2010 | Waters et al. | 707/769 |
| 2010/0281393 A1* | 11/2010 | Fujioka | 715/745 |
| 2011/0208768 A1 | 8/2011 | Mehanna | |

FOREIGN PATENT DOCUMENTS

| | | | |
|---|---|---|---|
| CN | 1723458 | | 1/2006 |
| CN | 1808430 | | 7/2006 |
| CN | 1848742 | | 10/2006 |
| CN | 1906610 | | 1/2007 |
| JP | 2003-099442 | | 4/2003 |
| JP | 2004505563 | | 2/2004 |
| JP | 2006/228198 | | 8/2006 |
| JP | 2007/012013 | | 1/2007 |
| KR | 20020005147 | | 1/2002 |
| KR | 20020006810 | | 1/2002 |
| KR | 20040052339 | | 6/2004 |
| KR | 20060027226 | | 3/2006 |
| KR | 1020060092993 A | | 8/2006 |
| WO | 0137465 | | 5/2001 |
| WO | WO 01/80077 | * | 10/2001 |
| WO | 0243310 | | 5/2002 |
| WO | WO 03/042866 | | 5/2003 |
| WO | 2005055196 | | 6/2005 |
| WO | WO 2005/072157 | | 8/2005 |
| WO | 2007004110 | | 1/2007 |
| WO | WO2008/030875 | * | 3/2008 |

OTHER PUBLICATIONS

Yahoo Search Engine, http://search.yahoo.com, downloaded on Sep. 19, 2008, pp. 1, United States.
Wachman, J. et al., "Tools for Browsing a TV Situation Comedy Based on Content Specific Attributes," Mar. 2001, Multimedia Tools and Applications, vol. 13 No. 3, p. 255-284, United States.
Tjondronegoro, D. et al., "Extensible detection and indexing of highlight events in broadcasted sports video," Jan. 2006, Proceedings of the 29th Australasian Computer Science Conference, Hobart, Australia.
Spalti, M., "Finding and Managing Web Content with Copernic 2000", Sep. 2000, Library Computing, Westport, pp. 217-221, vol. 18, No. 3, United States.
Rau Lisa, F. et al., "Domain-independent summarization of news," Jun. 1994, In Summarizing Text for Intelligent Communication, pp. 71-75, Dagstuhl, Germany.
Opera Software ASA, Opera Browser for Devices, http://www.opera.com/products/devices/, downloaded Sep. 19, 2008, pp. 1-2, United States.
Microsoft Corporation, MSN TV, http://www.webtv.com/pc, downloaded Sep. 19, 2008, pp. 1, United States.
Livingston, K. et al., "Beyond broadcast: a demo," Jan. 2003, In Proceedings of the 8th International Conference on Intelligent user Interfaces, ACM Press, New York, NY, pp. 260-262, United States.
Henzinger, M. et al., "Query-free news search," May 2003, Proceedings on the 12th International Conference on World Wide Web, Budapest, Hungary, United States.
Google Inc., Google Desktop Search, http://desktop.google.com, downloaded Sep. 19, 2008, pp. 1, United States.
Google Inc., Google Search Engine, http://www.google.com, downloaded Sep. 19, 2008, pp. 1, United States.
Brill, E., "A simple rule-based part of speech tagger", Mar. 1992, Proceedings of the Third Conference on Applied Natural Language Processing, Trento, Italy.
Babaguchi, N. et al., "Intermodal collaboration: A strategy for semantic content analysis for broadcasted sports analysis video", Sep. 2003, pp. 13-16, United States.
Apple Inc., Apple iTunes, http://www.apple.com/itunes/, Apr. 28, 2003, pp. 1-2, United States.
Moraveji, N. et al., "DynaLine: A Non-Disruptive TV User Interface for Passive Browsing of Internet Video," Microsoft Research Technical Report, 2006, pp. 1-4, United States.
Miyamori, H. et al., "Webified Video: Media Conversion from TV Programs to Web Content for Cross-Media Information Integration," Proceedings of the 16th International Conference on Database and Expert Systems Applications, 2005, pp. 176-185, Springer-Verlag, Berlin, Heidelberg, Germany.
Copernic Inc., Copernic Search Engine for your PC, http://www.copernic.com, downloaded Sep. 19, 2008, pp. 1, United States.
AOL LLC, http://www.aol.com, downloaded Sep. 19, 2008, pp. 1-2, United States.
Ask Search Engine, http://www.ask.com, downloaded Sep. 19, 2008, pp. 1, United States.
Microsoft Corporation, Microsoft Windows Media Player 10, http://www.microsoft.com/windows/windowsmedia/mp10, downloaded Sep. 19, 2008, United States.
Microsoft Corporation, Microsoft Windows Media Player, http://www.microsoft.com/windows/windowsmedia/, Sep. 19, 2008, pp. 1, United States.
Realnetworks, Inc., http://www.real.com, downloaded Sep. 19, 2008, United States.
Notification of Transmittal of the International Search Report and the Written Opinion of the International Search Authority Application No. PCT/KR2008/000537 dated May 15, 2008, 16 pages.
Notification of Transmittal of the International Search Report and the Written Opinion of the International Searching Authority for International Application No. PCT/KR2008/001558, dated Jun. 26, 2008, 10 pages.
Notification of Transmittal of the International Search Report and the Written Opinion of the International Searching Authority, dated Aug. 20, 2008; International Search Report and Written Opinion of the International Searching Authority for International Application No. PCT/KR2008/001941, 10 pages.
Livingston, K. at al., "Beyond broadcast: a demo," Jan. 2003, In Proceedings of the 8th International Conference on Intelligent user interfaces, ACM Press, New York, NY, pp, 325-325, United States.
"Placement in the DMOZ.org directory—Pure Power", DMOZ/Google Directory, posted on Apr. 30, 2005, http://www.ahfx.net/weblog/13, pp. 1-3, United States.
U.S. Advisory Action for U.S. Appl. No. 11/633,880 mailed Nov. 25, 2009.
U.S. Non-final Office Action for U.S. Appl. No. 11/633,880 mailed Jan. 6, 2009.
U.S. Non-final Office Action for U.S. Appl. No. 11/725,865 mailed Oct. 16, 2009.
U.S. Non-final Office Action for U.S. Appl. No. 11/713,350 mailed Mar. 2, 2009.
U.S. Final Office Action for U.S. Appl. No. 11/713,350 mailed Aug. 14, 2009.

(56) References Cited

OTHER PUBLICATIONS

U.S. Non-final Office Action for U.S. Appl. No. 11/803,826 mailed Jul. 24, 2009.
U.S. Non-final Office Action for U.S. Appl. No. 11/900,847 mailed Oct. 28, 2009.
Vechtomova, O. et al. "Query expansion with terms selected using lexical cohesion analysis of documents", Information Processing and Management: an International Journal, Oct. 2006, pp. 849-865, vol. 43, No. 4, Pergamon Press Inc., Tarrytown, New York, United States.
U.S. Final Office Action for U.S. Appl. No. 11/633,880 mailed Oct. 28, 2010.
U.S. Non-final Office Action for U.S. Appl. No. 11/725,865 mailed Sep. 14, 2010.
U.S. Final Office Action for U.S. Appl. No. 11/713,350 mailed Sep. 9, 2010.
U.S. Non-final Office Action for U.S. Appl. No. 11/633,880 mailed May 11, 2010.
U.S. Final Office Action for U.S. Appl. No. 11/725,865 mailed Mar. 16, 2010.
U.S. Non-final Office Action for U.S. Appl. No. 11/713,350 mailed Mar. 8, 2010.
U.S. Final Office Action for Application U.S. Appl. No. 11/803,826 mailed Mar. 3, 2010.
U.S. Office Action for U.S. Appl. No. 11/633,880 mailed Aug. 10, 2009.
Office Action dated Jun. 11, 2010 from U.S. Appl. No. 12/056,184.
Final Office Action dated Nov. 23, 2010 from U.S. Appl. No. 12/056,184.
Office Action dated May 19, 2009 from U.S. Appl. No. 11/726,340.
Office Action dated Jun. 5, 2009 from U.S. Appl. No. 11/732,887.
Copernic Inc., http://copernic.com/en/products/desktop-search/index.html, Sep. 18, 2008.
Final Office Action dated Sep. 2, 2010 from U.S. Appl. No. 11/969,778.
Office Action dated Apr. 19, 2010 from U.S. Appl. No. 11/969,778.
Chinese Office Action dated Aug. 14, 2009 issued in Chinese Patent Application No. 2008100826213.
Office Action dated Oct. 14, 2010 from U.S. Appl. No. 11/726,340.
U.S. Office Action dated Feb. 14, 2011 from U.S. Appl. No. 11/726,340.
Office Action dated Dec. 9, 2009 from U.S. Appl. No. 11/726,340.
Office Action dated Mar. 25, 2011 from U.S. Appl. No. 12/263,089.
Office Action dated Dec. 4, 2009 from U.S. Appl. No. 11/732,887.
Office Action dated Mar. 4, 2011 from U.S. Appl. No. 11/725,865.
Office Action dated Mar. 17, 2011 from U.S. Appl. No. 11/633,880.
Office Action dated Jun. 1, 2011 from U.S. Appl. No. 11/803,826.
Office Action dated Jun. 15, 2011 from U.S. Appl. No. 11/969,778.
Office Action dated Jun. 27, 2011 from U.S. Appl. No. 11/725,865.
Office Action dated Jul. 6, 2011 from U.S. Appl. No. 11/789,609.
Office Action dated Oct. 6, 2010 from U.S. Appl. No. 11/981,019.
Office Action dated Dec. 29, 2009 from U.S. Appl. No. 11/981,019.
Final Office Action dated Mar. 16, 2011 from U.S. Appl. No. 11/981,019.
Final Office Action dated Jun. 17, 2010 from U.S. Appl. No. 11/981,019.
Office Action dated Aug. 2, 2011 from U.S. Appl. No. 11/713,312.
Google Inc., webhp, http://www.google.com/webhp?complete-1&hl-en, downloaded Sep. 25, 2008, p. 1.
Office Action dated Mar. 25, 2010 from Chinese Patent Application No. 200810082621.3, 7pp., China (English-language translation included—15 pp).
Tivo Inc., http://www.tivo.com, downloaded Sep. 19, 2008, 1 page.
"Computing Meng Individual Project, ANSES—Automatic News Summarization and Extraction System, "http://mmis.doc.ic.ac.uk/pr-1.wong-2002/overview.html, downloaded Sep. 24, 2008, 4 pages.
Miyauchi et al., "Highlight Detection and Indexing in Broadcast Sports Video by Collaborative Processing of Text, Audio, and Image," Sytstems and Computers in Japan, vol. 34, No. 12, 2003, pp. 22-31, Translated from Denshi Joho Tsushin Gakkai Ronbunshi, vol. J85-D-II, No. 11, Nov. 2002, pp. 1692-1700.

Nitta, Naoka et al., "Automatic Story Segmentation of Closed-Caption Text for Semantic Content Analysis of Broadcasted Sports Video," 8th International Workshop on Multimedia Information Systems, 2002, pp. 110-116.
Miura, K. et al., "Automatic Generation of a Multimedia Encyclopedia from TV Programs by Using Closed Captions and Detecting Principal Viedo Objects," Proceedings of the Eigth IEEE International Sympsosium on Miltumedia (ISM ' 06), 2006, IEEE, 8 pages.
Office Action dated Aug. 19, 2011 from U.S. Appl. No. 11/821,938.
Office Action dated Aug. 22, 2011 from U.S. Appl. No. 11/981,019.
Final Office Action dated Sep. 1, 2011 from U.S. Appl. No. 12/263,089.
Final Office Action dated Sep. 21, 2011 from U.S. Appl. No. 11/633,880.
Final Office Action dated Sep. 27, 2011 from U.S. Appl. No. 11/969,778.
Notice of Allowance dated Nov. 1, 2011 from U.S. Appl. No. 11/821,938.
Chinese Office Action dated Feb. 1, 2011 from Chinese Application No. 2007101962371.
Final Office Action dated Nov. 10, 2011 from U.S. Appl. No. 11/803,826.
Chinese Office Action dated Sep. 23, 2011 from Chinese Application No. 200880016311.X.
Chinese Office Action dated Sep. 8, 2011 from Chinese Application No. 200880009063.6.
Notice of Allowance dated Jan. 30, 2012 from U.S. Appl. No. 11/981,019.
Office Action dated Mar. 29, 2012 from U.S. Appl. No. 11/726,340.
Office Action dated Mar. 30, 2012 from U.S. Appl. No. 11/633,880.
Japanese Office Action dated Mar. 21, 2012 from Japanese Application No. 2009-554447—A machine English translation is included herewith.
Japanese Office Action dated Apr. 10, 2012 from Japanese Application No. 2010-508303—A machine English translation is included herewith.
Chinese Office Action dated Apr. 17, 2012 from Chinese Application No. 200880016311.X—A machine English translation is included herewith.
Chinese Office Action dated Aug. 28, 2012 for Chinese Application No. 200880016311.X from China Patent Office, pp. 1-24, People's Republic of China (English-language translation included, pp. 1-15).
U.S. Notice of Allowance for U.S. Appl. No. 11/633,880 mailed Oct. 24, 2012, United States.
Chinese Office Action dated Mar. 7, 2013 for Chinese Application No. 200880016311.X from China Intellectual Property Office, pp. 1-25, People's Republic of China (English-language translation included, pp. 1-16).
U.S. Notice of Allowance for U.S. Appl. No. 11/726,340 mailed Apr. 29, 2013.
Japanese Office Action dated Nov. 20, 2012 for Japanese Application No. 2009554447 from Japan Patent Office, pp. 1-4, Tokyo, Japan (Machine generated English-language translation included, pp. 1-2).
U.S. Non-Final Office Action for U.S. Appl. No. 11/633,880 mailed Sep. 26, 2013.
U.S. Advisory Action for U.S. Appl. No. 11/633,880 mailed Aug. 21, 2014.
Korean Office Action dated Apr. 29, 2014 for Korean Application No. 10-2008-7016274 from Korean Patent Office, pp. 1-13, Daejeon, Republic of Korea (Machine-generated English-language translation, pp. 7-13).
U.S. Advisory Action for U.S. Appl. No. 11/633,880 mailed Jul. 11, 2014.
U.S. Final Office Action for U.S. Appl. No. 11/633,880 mailed May 7, 2014.
U.S. Notice of Allowance for U.S. Appl. No. 11/803,826 (SISAP164/ADV06-CE14) mailed Mar. 27, 2014.
U.S. Notice of Allowance for U.S. Appl. No. 11/633,880 mailed Sep. 23, 2014.

\* cited by examiner

METHOD AND SYSTEM FOR UTILIZING PACKAGED CONTENT SOURCES TO IDENTIFY AND PROVIDE INFORMATION BASED ON CONTEXTUAL INFORMATION

RELATED APPLICATION

This application claims priority from U.S. Provisional Patent Application Ser. No. 61/095,922, filed on Sep. 10, 2008, incorporated herein by reference.

FIELD OF THE INVENTION

The present invention relates to providing access to information based on contextual information.

BACKGROUND OF THE INVENTION

Software platform technologies such as widgets and downloadable applications/applets provide packaging a service or content source for consumer electronics devices. A widget comprises a package of graphics and script code that may be overlaid on an electronic device display screen to provide information to the user. For example, a weather widget may present content overlaid on the main data such that the graphic for the current conditions and temperature are made available. Widgets have a simple lifecycle in that they are downloaded, displayed, minimized and stopped. The interaction of the widget with the underlying software platform is limited because the platform only enables the widget to fetch data from the network and display on the screen for user viewing.

Downloadable applications and applets, particularly such as those in Java, are similar to widgets, but provide more extensive Application Programming Interface (API) for interaction. Java applications are capable of providing complex animations as well as complex network protocols. However, as with widgets, Java applications have limited ability to interact with the underlying platform or other software components. In other applications, a search engine is used to obtain content for a particular topic (set of keywords) based on internet infrastructure.

BRIEF SUMMARY OF THE INVENTION

A method and system utilizing packaged content sources to identify and provide information of potential interest to a user based on contextual information is provided. One embodiment comprises a computer-implemented method for providing access to content, including receiving contextual information, and querying a packaged content source for content related to the contextual information. The method further includes indicating content relating to the contextual information available from the packaged content source.

DESCRIPTION OF THE INVENTION

The invention provides a method and system for utilizing packaged content sources to identify and provide information based on contextual information. One embodiment involves a process for interacting with, and relating, content sources and representations with contextual information.

For example, packaged content sources, such as widgets, are utilized to find content sources for recommendation based on contextual information. As such, a search facilitator process according to the invention enables a contextual recommendation system (e.g., See'N'Search) to interact with sources of information to be recommended by the recommendation system. The recommendation system is enabled to interact with packaged content sources.

The search facilitator process allows querying a dynamic packaged content source for available content. The search facilitator process further allows initiating a request to a packaged content source for information (e.g., content) relevant to contextual information, and displaying such information.

In one embodiment, a packaged content source is downloadable code that is executed to provide access to content data. A packaged content source comprises executable program code including a function to obtain information (such as over a network), and includes a function to source content using internal functionality. The packaged content source is executed locally on the processor of an electronic device it is downloaded to. The packaged content source includes interfaces, and when executed the packaged content source operates to obtain content information. The electronic device (e.g., a computer or a consumer electronics device) is provided a packaged content source from a remote location. The electronic device also receives contextual information. The electronic device then executes the packaged content source locally (i.e., local to the contextual information), wherein the packaged content source makes requests to obtain information based on the contextual information.

One embodiment provides a system implementing a search facilitator process for using content sources to source information such that a software module utilizing the facilitator process does not require information about the packaged content sources themselves. Such a software module may be a contextual recommender which may initiate a request to the search facilitator process based on contextual information, such as topics (e.g., set of keywords), that the contextual recommender may wish to suggest to the user. The search facilitator process utilizes packaged content sources that provide content source processing implemented in a packaged content source platform, such as in widget platform application logic. The packaged content sources may also include applets such as Java Applets. The user is provided with information relevant to the contextual information without a need for the contextual recommender to have information about the packaged content sources themselves. An implementation of the invention is described below in conjunction with widgets running on widget platforms.

Widget platforms provide an approach to making information available to users as a package, similar to HTML and a browser for displaying information content on a display screen of an electronic device. Several widget platforms exist, such as Konfabulator (now Yahoo! Widgets), Vista Sidebar, Google Widgets, Nokia Widgets, etc. Rather than assuming an opaque background and full screen display as in a browser, widget platforms take up a small portion of the display, allowing the user to "see through/around" the content displayed.

In widget platforms, the display is not rendered declaratively (e.g., using HTML), but instead, using a scripting language on a graphics/networking application programming interface (API). As such, widgets (running on widget platforms) are more suitable for displaying dynamic information because the script code in the widgets can make multiple requests to obtain information (e.g., over a period of time). Widgets are often based on a scripting language and are the web equivalent of Java Applets for Java.

Figure 1:
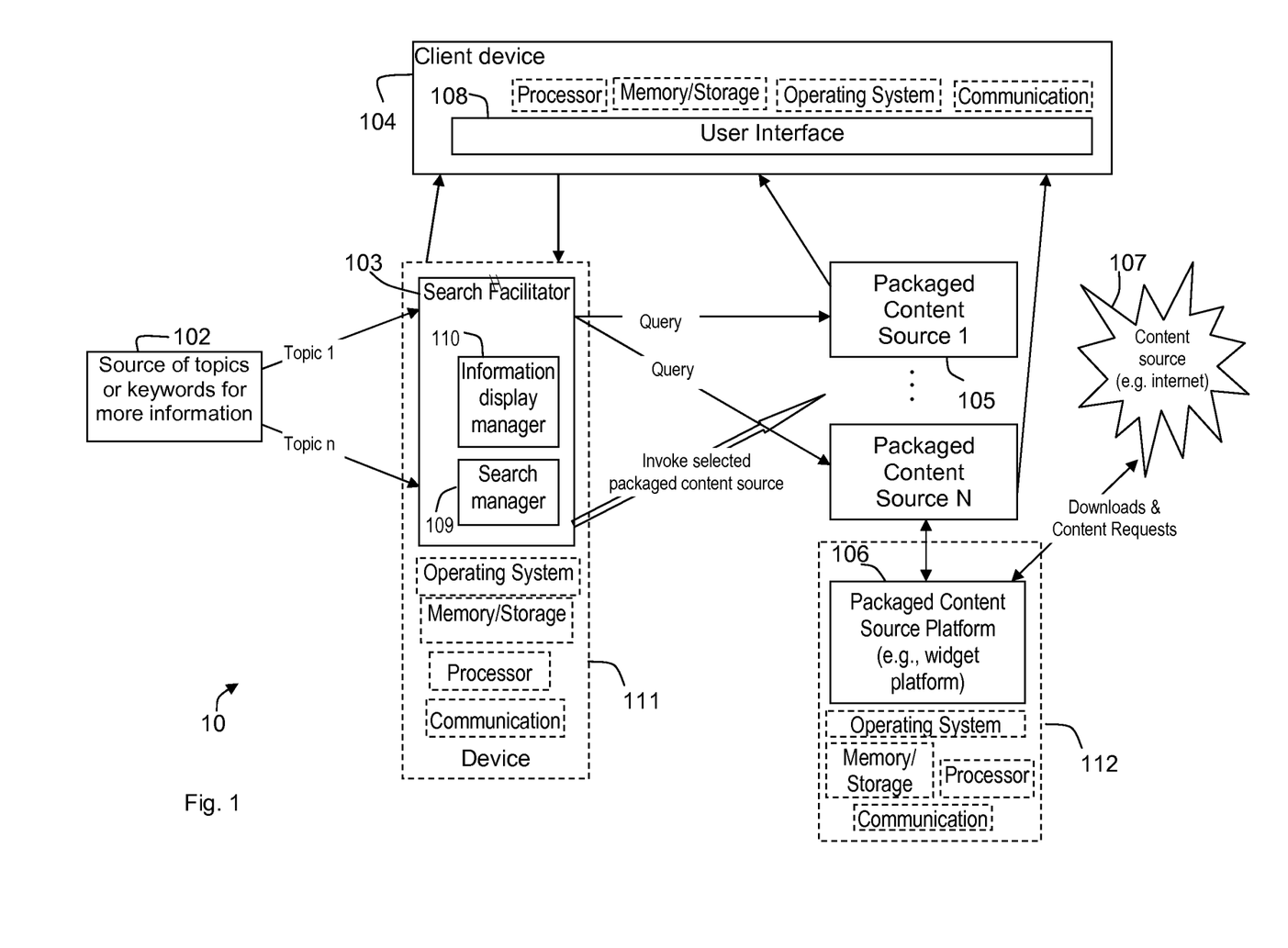
FIG. 1 shows a functional block diagram of a system utilizing packaged content sources to identify and provide information based on contextual information, according to an embodiment of the invention.

FIG. 1 shows a functional block diagram of an example system 10 implementing a search facilitator process for interacting with, and relating, content sources/representations with contextual information, according to an embodiment of the invention. The process utilizes packaged content sources (e.g., widgets) to identify and provide information of potential interest to a user based on contextual information. The system 10 includes a search facilitator 103, a packaged content source platform (e.g., widget platform) 106, N package content sources 105 (e.g., widgets) running on the packaged content source platform 106, and a client device 104 providing a user interface (UI) 108. The client device 104 may comprise a consumer electronics device (having a processor, memory, etc.) capable of displaying information and receiving user comments/input.

A packaged content source 105 may execute on e.g., a device 111 or the device 104, which may communicate with the packaged content source platform 106 that may execute on a device 112 (remote or local to client 104) in a network. The search facilitator 103 may execute on the device 104, wherein the client device 104 or another device 111 in a network including devices 104, 111 (an example of such a network is provided in relation to FIG. 4 further below). Although in FIG. 1, the devices 104 and 112 are shown as separate devices, this is not a requirement. The devices 104 and 112 may be the same singular device which includes functionality of both the devices 104 and 112.

An overall process utilizing packaged content sources (e.g., widgets) to identify and provide information of potential interest to a user based on contextual information, according to the invention is now described in relation to FIG. 1. One or more topics 102 (e.g., keywords, etc.) of interest to the user are determined and each topic is passed to the search facilitator 103 which may include a search manager 109 and an information display manager 110. The search manager 109 queries packaged content sources 105 for available content related to user-selected topic. Packaged content sources 105 send content to the system.

The information display manager 110 selectively displays information about the packaged content sources 105 that have such content available, on a UI 108 of the device 104. The user may select a displayed packaged content source 105 from the UI 108 wherein the search facilitator 103 invokes the selected packaged content source 105 to execute on the selected packaged content source platform 106, passing along the user-selected topic to obtain related content. The obtained related content may be directly rendered on the UI 108 by the packaged content source platform 106.

Figure 2:
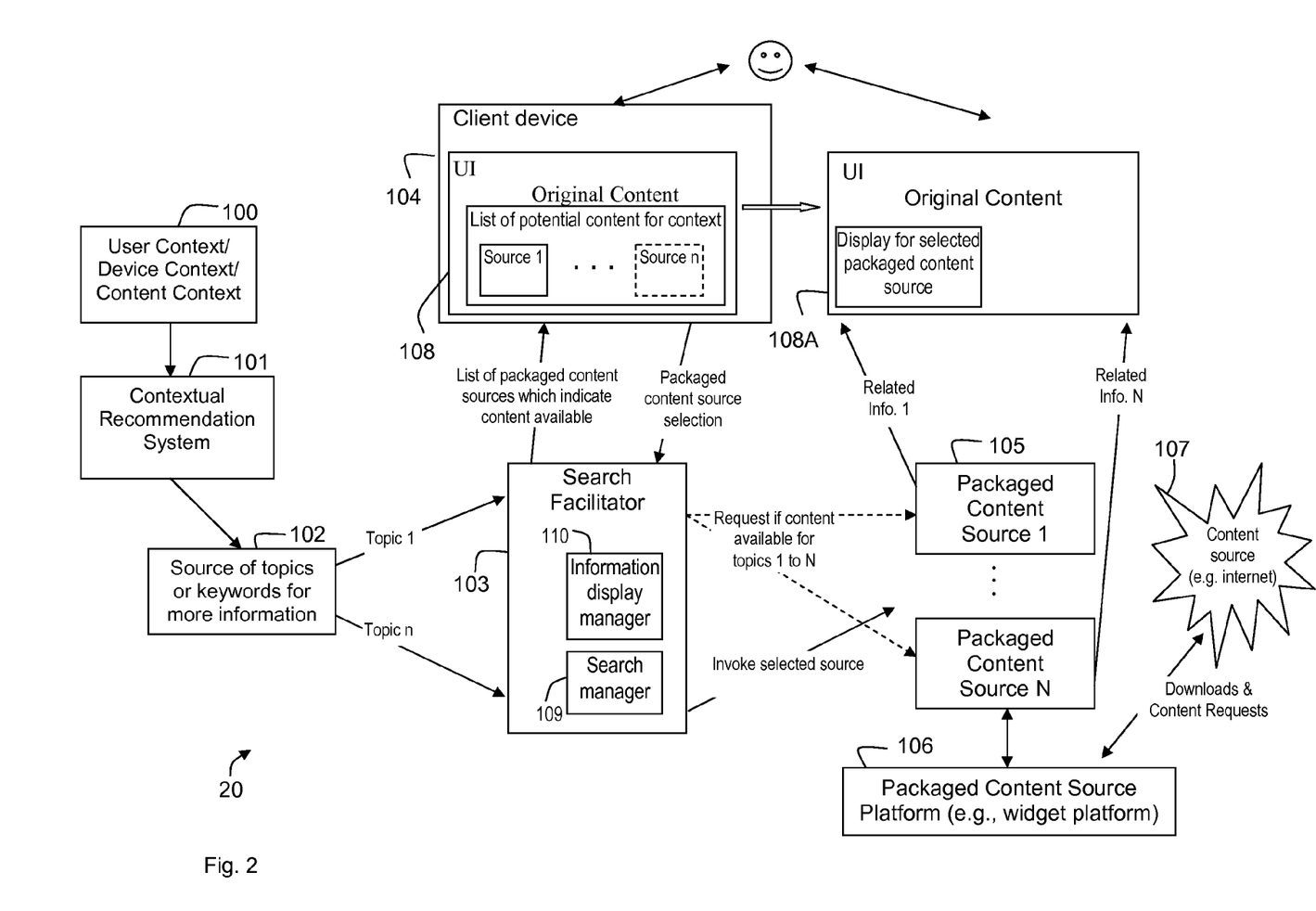
FIG. 2 shows a functional block diagram of a system utilizing packaged content sources (e.g., widgets) to identify and provide information of potential interest to a user based on contextual information, according to an embodiment of the invention.
Figure 3:
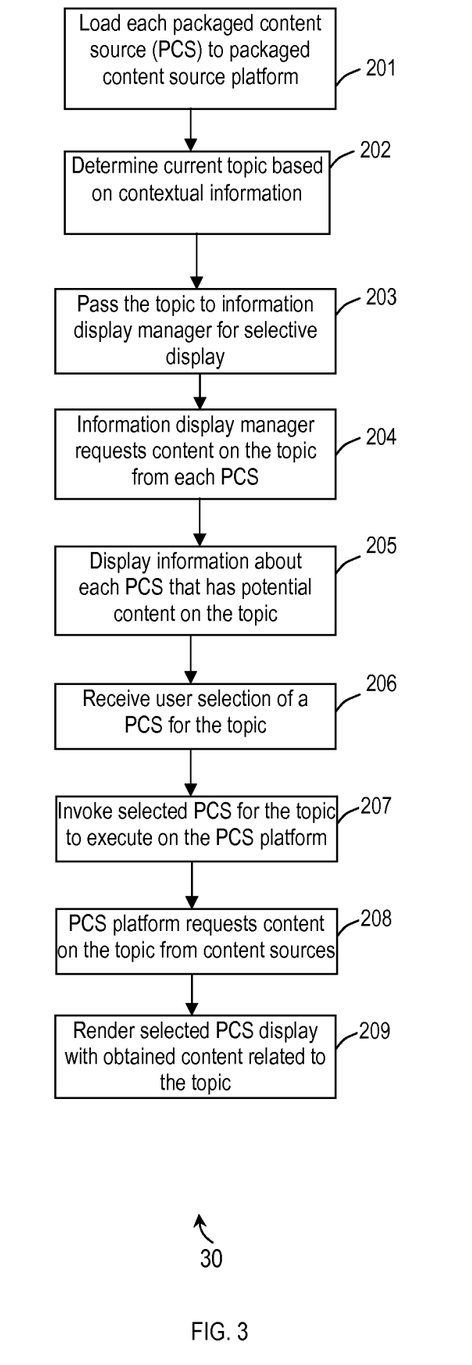
FIG. 3 shows a process utilizing packaged content sources to identify and provide information based on contextual information, according to an embodiment of the invention.

A more detailed process utilizing packaged content sources (e.g., widgets) to identify and provide information of potential interest to a user based on contextual information, according to the invention is now described. FIG. 2 shows a functional block diagram of an example system 20 according to the invention, which includes components of the system 10, and further includes contextual information 100 and a contextual recommendation system 101. FIG. 3 shows a flowchart of a process 30 implemented by system 20 for utilizing packaged content sources (e.g., widgets) to identify and provide information of potential interest to a user based on contextual information, according to an embodiment of the invention.

Initially, in block 201 the packaged content source software platform 106 has either already downloaded each packaged content source (PCS) 105 or does so at start up. In block 202, the contextual recommender system 101 uses contextual information 100 to determine current topics. In one example, the contextual recommendation system 101 uses contextual information 100 to determine one or more topics 102 (e.g., keywords, etc.) that is of interest to the user. Contextual information 100 may include user context, device context, and/or content context. User context may include, for example, user actions, history, profile. Device context may include, for example, current content accessed by the device or in the network, metadata such as closed-captions, Electronic Programming Guide (EPG). Content context provides content more meaning than simply words.

In block 203, once one or more topics have been determined, each topic is passed to the search facilitator 103 (e.g., software component which may include a searching function and an information display manager function).

In block 204, the search facilitator 103 may first pass each topic to each packaged content source 105 as a request, to determine if each packaged content source 105 has any content for the topic. Each request functions as a callback into the respective packaged content source and causes the program logic of the packaged content source to perform its programmed steps necessary to determine if such requested content is available. In addition a packaged content source may inform the system on its own volition.

In block 205, information (e.g., identification, hyperlink) about each packaged content source 105 that responds with "TRUE" for potential content is displayed to the user on the user interface (UI) 108 of the client device 104. Optionally, information about all the packaged content sources 105 is listed to the user for them to select amongst on the UI 108.

In block 206, the UI 108 visually renders information and availability from the packaged content sources 105 to the user (e.g., Source 1, . . . , Source n). When multiple topics are available, the UI 108 may optionally allow the user to switch among such topics to browse the topics and also view the content available from the corresponding packaged content sources.

In block 207, the UI 108 invokes the selected packaged content source via the information display manager to run (execute) on the packaged content source platform 106. The selected topic is passed to the invoked packaged content source.

In block 208, the packaged content source platform 106 performs any necessary functions or backend content sources 107 (FIG. 2) such as the Internet or search engines, in order to display content related to the selected topic. The search facilitator may selectively display information from packaged content sources 105 to the user on a user interface 108 of a device 104.

In block 209, packaged content source invocation causes the UI 108 of the device 104 to change to UI 108A (FIG. 2), wherein the selected packaged content source (i.e., widget) display is rendered on the UI 108A to the user with obtained content related to the selected topic. Optionally, the invoked packaged content source may ignore the passed topics and display generic information.

The invention provides a mechanism comprising the search facilitator 103 which allows a software component, such as the contextual recommendation system 101 to interact with packaged content sources 105 via the search facilitator 103, to determine if there is related information that the contextual recommendation system 101 can use (e.g., recommend to the user). This enables the contextual recommendation system 101 to avoid using a search engine or database directly to find content related to topic. Instead, the search facilitator 103 enables the contextual recommendation system 101 to use packaged content sources 105 for which a method of fetching results is encapsulated as to be opaque to the rest of the system.

Given contextual information, the search facilitator 103 enables interaction with packaged content sources 105 such as (e.g., widgets, packaged downloadable applications) to determine related content for recommendation. Widgets comprise package of graphics and script code that may be overlaid on the screen to provide information to the user.

The system 20 enables querying (requesting) dynamic packaged content sources 105 from another software component such as the contextual recommender system 101, to determine whether content related to a topic is available from such sources. Optionally a packaged content source may inform the platform 106 of its interests. In the query step it is determined if related content is available, then in the invocation step the packaged content source renders the related content accordingly (e.g., the related content itself may be directly rendered on the UI 108A by the packaged content source platform 106).

The system 20 enables a software component to initiate a request to package content sources to display content. The system 20 allows querying packaged content sources, passing a particular (selected or current) topic to the packaged content source, so that they may be related to the initiating request.

The contextual recommendation system determines from a content source a set of topics (e.g., multiple keywords, determined from closed captions of a video program the user is watching of a client device such as a digital TV) that the contextual recommendation system wishes to recommend to the user. For each possible packaged content source, the search facilitator passes each topic to each packaged content source API to determine if any content is available for that source. Information about each packaged content source that returned "True" (or met a threshold via a ranking criteria) is then displayed to the user.

The user then selects one of the topic/source combinations. At which time the search facilitator initiates a call to a selected packaged content source to initiate rendering the widget. Optionally the initiation may pass the current selected topic (or related topics) to the packaged content source so that the packaged content source can display related content on that particular topic. The packaged content source displays its content according to its internal method and optionally uses the passed topic to direct the data that is displayed to the user.

In another embodiment, a software component such as a contextual recommender desiring to use a packaged content source, determines a topic (e.g., multiple keywords, determined from closed captions of a video program the user is watching of a client device such as a TV) and utilizes the search facilitator which queries one or more packaged content sources to check for related information for the user.

Optionally, for each possible packaged content source (e.g., widget, applet), the search facilitator may pass each topic in the form of a set of keywords to each packaged content source API to determine if any content is available from that source. The API called may return a True/False value or may return a quality value (e.g., x out of 10) to the calling component. For each packaged content source that returned 'True' (or met a threshold via a ranking criteria), the obtained related content is then displayed to the user. For example, "YouTube videos on 'George Bush'".

If the search facilitator did not execute that optional step of passing each topic in the form of a set of keywords to each packaged content source, then for each packaged content source, the search facilitator displays the content source name and the topic to the user. The user then selects one of the topic/source combinations the user wishes to view the content for. At which time the search facilitator initiates a call to the packaged content source to initiate rendering the content source. The call may pass the current selected topic (or related topics) to the packaged content source so that it can display content to that particular topic. The packaged content source displays its content according to its internal method (program logic) and optionally uses the passed topic to direct the data that is displayed to the user.

Figure 4:
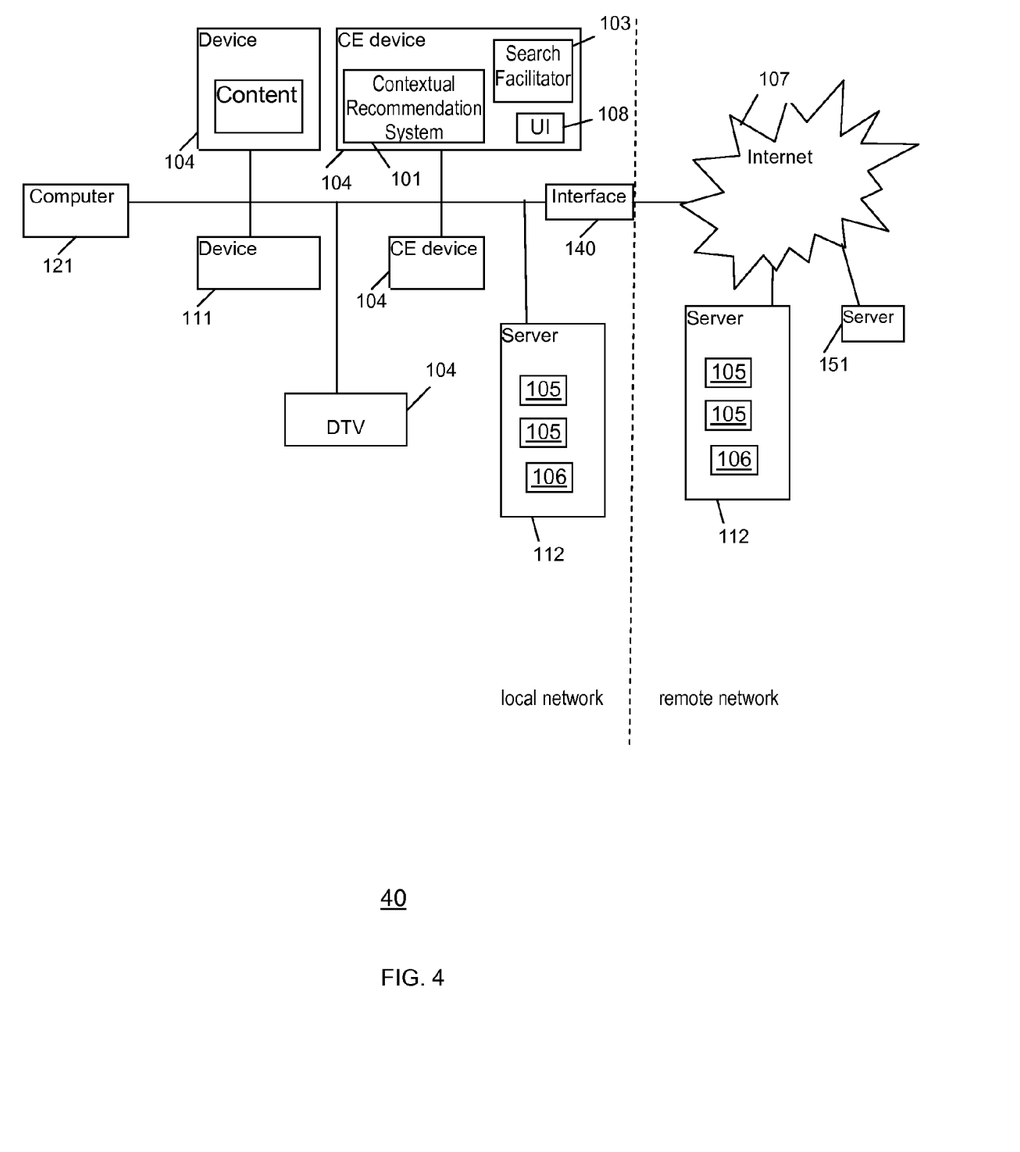
FIG. 4 shows a functional block diagram of a network implementing a process utilizing packaged content sources to identify and provide information based on contextual information, according to an embodiment of the invention.

FIG. 4 shows a functional architecture of an example network 40, including a local network and an external (remote) network. The local network may comprise a local area network of electronic devices, embodying aspects of the present invention. The local network comprises an electronic device 111 which includes processing capability, a personal computer (PC) 121, consumer electronics (CE) devices 104 which may include content, and an interface 140 that connects the local network to the remote network (e.g., another local network, the Internet 107) via a communication line.

The remote network can include devices 112 and 151. The local network may implement the Universal Plug and Play (UPnP) protocol or other network communication protocols (e.g., Jini, HAVi, IEEE 1394, etc.). The local network can be a wireless network, a wired network, or a combination thereof. Examples of CE devices include digital televisions (DTVs, PDAs, media players, etc.). The local network further includes a search facilitator 103 implemented in a CE device 104 having a UI 108 and further implementing a contextual recommendation system 101. The local network may further include a device 112 implementing packaged content source platform 106 for package content sources 105. The remote network may further include a device 112 implementing packaged content source platform 106 for package content sources 105.

The search facilitator 103 initiates the package content sources 105 programmatically for the contextual recommendation system 101. The search facilitator 103 may request a package content sources 105 to indicate if it has content available for a particular context (e.g., topic such as a set of keywords). The search facilitator 103 may parameterize (i.e., provide contextual information) a request to a package content source 105 in the form of e.g., a topic such as a set of keywords, so that the package content source 105 may provide information related to the context.

In this way, a contextual recommendation system may access packaged content sources to render information related to contextual information on a display screen without relying on a web browser or video player application.

An example of the contextual recommendation system is described below. The contextual recommendation system provides the following functions:

1. Mapping the functionalities that support an information search to a small number of keys (e.g., mapping such functionalities to a few keys of a TV remote control, as an example for receiving user input when using a digital TV (DTV) for information access).
2. Enabling the user to express interest in obtaining additional information related to information currently accessed by the user (e.g., providing an "info." button on the remote control for the user to press, and mapping this action into a "more info" request, etc.).
3. Enabling the user to indicate the specific type of additional information the user is looking for, after the user has expressed interest in accessing additional information. An example involves displaying a set of keywords related to the data that the user has expressed interest in (e.g., a TV program or media content the user is accessing). Then, providing a combination of keys (e.g., up/down/right/left arrow keys) on a remote control for the user to select one of the keywords as one or more topics.
4. Enabling the user to refine or edit a suggested topic, such as by displaying a set of additional topic suggestions that contain, or are related to, the selected keyword and providing a combination of the arrow keys (up/down/right/left arrows) on the remote control for the user to select one of the topic suggestions. The graphical user interface (GUI) allows the user to refine the search topics as many times as the user desires by just repeating the process described above. Further, the topic suggestions are displayed in an editable text box that allows the user to delete existing characters or enter new characters to modify the topic as desired. This can be performed using, e.g., a wireless keyboard or a remote control that has an inbuilt keypad. The topics include information that provide the source of topics.

In one example, a topic identification function performs the above steps to identify potential data of interest to the user (e.g., source of topics) based on the user's current application state. Current application state refers to the state of the application that the user is using at the time the user desires to access relevant content. For example, if the user is watching a television program on DTV, the channel the DTV is tuned to and the program being broadcast, constitute the application state. The topic identification function identifies the content used/rendered by the application. Then, the topic identification function obtains metadata information and/or other associated data for the content being accessed, and identifies potential topics that might represent the data of interest to the user.

When a user accesses content that has structured meta-data available, the topic identification function directly uses field/value pairs from the metadata as potential topics. For example, if a user is listening to a music album by the artist "Sting" and expresses interest to access related content, the topic identification function obtains the following fields from the album's metadata (content="MusicAlbum" and artist="Sting") and using these, the topic identification function infers that the user might be interested to access more albums by the same artist and suggests (MusicAlbum, artist, "Sting") as one of the topics to the user.

When a user accesses content such as broadcast TV programs and DVDs, the topic identification function uses the caption data (closed captions), that is embedded in the content stream, to identify topics. This embedded caption data contains useful information in the form of keywords. When a user watches a TV program and expresses interest to access related content, the topic identification function analyzes the TV program's caption text to identify significant keywords and suggests them to the user as possible search topics.

An example of identifying keywords and suggesting them as possible topics by the topic identification function involves utilizing natural language processing (NLP) to analyze closed captions and identify keywords from the captions. The closed captions (CC) of a TV program are embedded in the TV signal by the content provider before it is broadcast. They are primarily for the benefit of the hearing impaired.

In another embodiment, associated with a packaged content source such as a widget is type of information the widget is interested in (implemented as a function call or configuration), and a list of keywords the widget is interested in. Each widget has descriptions attached to it that tells the system what kind of information the widget is interested in (e.g., people, places, dates). As such, a particular widget is invoked only when information of the type the widget is interested in is involved. The information may comprise keywords in contextual information. A packaged content source is configured for informing the system of the type of information of interest to the packaged content source. A search manager configured for querying a packaged content source for content related to the contextual information, based on information of interest to the packaged content source.

As is known to those skilled in the art, the aforementioned example architectures described above, according to the invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

Figure 5:
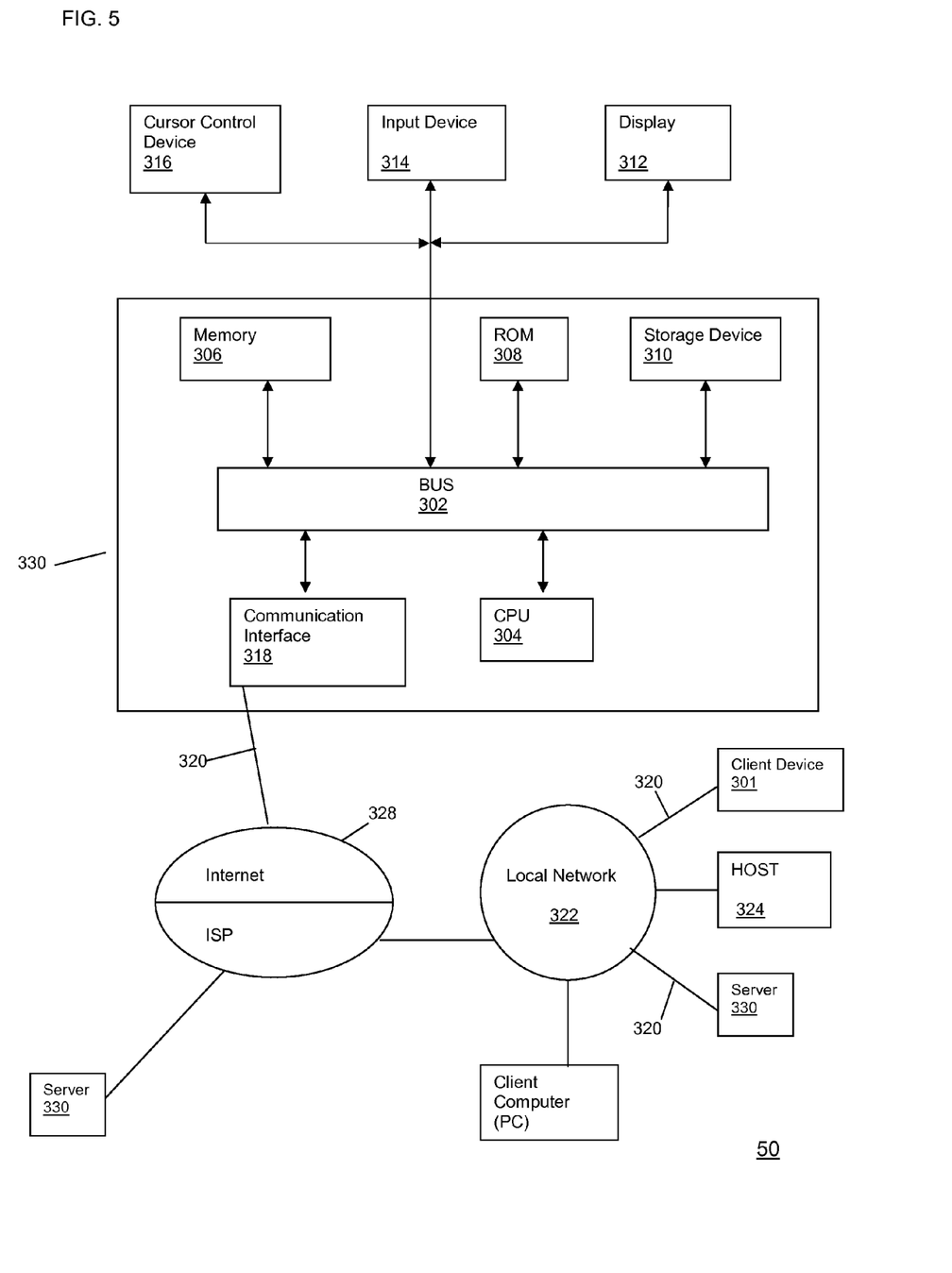
FIG. 5 shows a functional block diagram of a computing system suitable for implementing an embodiment of the invention.

FIG. 5 shows a block diagram of an example system 50 in which an embodiment of the invention may be implemented. The system 50 includes one or more client devices 301 such as consumer electronics devices, connected to one or more server computing systems 330. A server 330 includes a bus 302 or other communication mechanism for communicating information, and a processor (CPU) 304 coupled with the bus 302 for processing information. The server 330 also includes a main memory 306, such as a random access memory (RAM) or other dynamic storage device, coupled to the bus 302 for storing information and instructions to be executed by the processor 304. The main memory 306 also may be used for storing temporary variables or other intermediate information during execution or instructions to be executed by the processor 304. The server computer system 330 further includes a read only memory (ROM) 308 or other static storage device coupled to the bus 302 for storing static information and instructions for the processor 304. A storage device 310, such as a magnetic disk or optical disk, is provided and coupled to the bus 302 for storing information and instructions. The bus 302 may contain, for example, thirty-two address lines for addressing video memory or main memory 306. The bus 302 can also include, for example, a 32-bit data bus for transferring data between and among the components, such as the CPU 304, the main memory 306, video memory and the storage 310. Alternatively, multiplex data/address lines may be used instead of separate data and address lines.

The server 330 may be coupled via the bus 302 to a display 312 for displaying information to a computer user. An input device 314, including alphanumeric and other keys, is coupled to the bus 302 for communicating information and command selections to the processor 304. Another type or user input device comprises cursor control 316, such as a mouse, a trackball, or cursor direction keys for communicating direction information and command selections to the processor 304 and for controlling cursor movement on the display 312.

According to one embodiment of the invention, the functions of the invention are performed by the processor 304 executing one or more sequences of one or more instructions contained in the main memory 306. Such instructions may be read into the main memory 306 from another computer-readable medium, such as the storage device 310. Execution of the sequences of instructions contained in the main memory 306 causes the processor 304 to perform the process steps described herein. One or more processors in a multi-processing arrangement may also be employed to execute the sequences of instructions contained in the main memory 306. In alternative embodiments, hard-wired circuitry may be used in place of or in combination with software instructions to implement the invention. Thus, embodiments of the invention are not limited to any specific combination of hardware circuitry and software.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

Generally, the term "computer-readable medium" as used herein refers to any medium that participated in providing instructions to the processor 304 for execution. Such a medium may take many forms, including but not limited to, non-volatile media, volatile media, and transmission media. Non-volatile media includes, for example, optical or magnetic disks, such as the storage device 310. Volatile media includes dynamic memory, such as the main memory 306. Transmission media includes coaxial cables, copper wire and fiber optics, including the wires that comprise the bus 302. Transmission media can also take the form of acoustic or light waves, such as those generated during radio wave and infrared data communications.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, an EPROM, a FLASH-EPROM, any other memory chip or cartridge, a carrier wave as described hereinafter, or any other medium from which a computer can read.

Various forms of computer readable media may be involved in carrying one or more sequences of one or more instructions to the processor 304 for execution. For example, the instructions may initially be carried on a magnetic disk of a remote computer. The remote computer can load the instructions into its dynamic memory and send the instructions over a telephone line using a modem. A modem local to the server 330 can receive the data on the telephone line and use an infrared transmitter to convert the data to an infrared signal. An infrared detector coupled to the bus 302 can receive the data carried in the infrared signal and place the data on the bus 302. The bus 302 carries the data to the main memory 306, from which the processor 304 retrieves and executes the instructions. The instructions received from the main memory 306 may optionally be stored on the storage device 310 either before or after execution by the processor 304.

The server 330 also includes a communication interface 318 coupled to the bus 302. The communication interface 318 provides a two-way data communication coupling to a network link 320 that is connected to the world wide packet data communication network now commonly referred to as the Internet 328. The Internet 328 uses electrical, electromagnetic or optical signals that carry digital data streams. The signals through the various networks and the signals on the network link 320 and through the communication interface 318, which carry the digital data to and from the server 330, are exemplary forms or carrier waves transporting the information.

In another embodiment of the server 330, interface 318 is connected to a network 322 via a communication link 320. For example, the communication interface 318 may be an integrated services digital network (ISDN) card or a modem to provide a data communication connection to a corresponding type of telephone line, which can comprise part of the network link 320. As another example, the communication interface 318 may be a local area network (LAN) card to provide a data communication connection to a compatible LAN. Wireless links may also be implemented. In any such implementation, the communication interface 318 sends and receives electrical electromagnetic or optical signals that carry digital data streams representing various types of information.

The network link 320 typically provides data communication through one or more networks to other data devices. For example, the network link 320 may provide a connection through the local network 322 to a host computer 324 or to data equipment operated by an Internet Service Provider (ISP) 326. The ISP 326 in turn provides data communication services through the Internet 328. The local network 322 and the Internet 328 both use electrical, electromagnetic or optical signals that carry digital data streams. The signals through the various networks and the signals on the network link 320 and through the communication interface 318, which carry the digital data to and from the server 330, are exemplary forms or carrier waves transporting the information.

The server 330 can send/receive messages and data, including e-mail, program code, through the network, the network link 320 and the communication interface 318. Further, the communication interface 318 can comprise a USB/Tuner and the network link 320 may be an antenna or cable for connecting the server 330 to a cable provider, satellite provider or other terrestrial transmission system for receiving messages, data and program code from another source.

The example versions of the invention described herein may be implemented as logical operations in a distributed processing system such as the system 50 including the servers 330. The logical operations of the present invention may be implemented as a sequence of steps executing in the server 330, and as interconnected machine modules within the system 50. The implementation is a matter of choice and can depend on performance of the system 50 implementing the invention. As such, the logical operations constituting said example versions of the invention are referred to for e.g., as operations, steps or modules.

Similar to a server 330 described above, a client device 301 can include a processor, memory, storage device, display, input device and communication interface (e.g., e-mail interface) for connecting the client device to the Internet 328, the ISP 326, or LAN 322, for communication with the servers 330.

The system 50 can further include computers (e.g., personal computers, computing nodes) 305 operating in the same manner as client devices 301, wherein a user can utilize one or more computers 305 to manage data in the server 330.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof; however, other versions are possible. Therefore, the spirit and scope of the appended claims should not be limited to the description of the preferred versions contained herein.

What is claimed is:

1. A computer-implemented method for providing access to content, comprising:
   receiving contextual information that includes information related to accessed content;
   obtaining metadata information related to the accessed content;
   determining a current application state of an application through which the accessed content is rendered;
   in response to a request for additional content related to the accessed content, determining one or more suggested topics of interest based on the contextual information, the metadata information and the current application state;
   querying at least one widget in a widget platform having multiple widgets for content related to the one or more suggested topics of interest by passing one or more keywords associated with the one or more suggested topics of interest to the at least one widget, wherein each widget is a portable, interactive package of graphics and script code that may be overlaid on a display to provide information;
   indicating content related to the one or more suggested topics of interest available from at least one widget in the widget platform;
   automatically invoking each widget in the widget platform that indicates available content related to the one or more suggested topics of interest; and
   displaying content related to the one or more suggested topics of interest on a display of an electronic device;
   wherein each widget in the widget platform is associated with a corresponding description identifying a type of information of interest the widget is configured to provide, such that the widget is invoked only when the type of information of interest corresponds to the one or more suggested topics of interest;
   wherein the contextual information further includes one or more of: information of user interest, user context, device context, content context; and
   wherein the contextual information is received from a contextual recommendation system that seeks to provide user access to additional content related to the contextual information.

2. The method of claim 1 wherein:
   the accessed content includes previously accessed content, wherein the previously accessed content represents content accessed by the device in the past;
   indicating content relating to the one or more suggested topics of interest further includes:
      displaying information about each widget that indicates available content related to the one or more suggested topics of interest on the display;
      receiving user selection of a displayed widget source;
      automatically invoking the selected widget to request content related to the one or more suggested topics of interest from one or more content sources by passing the one or more suggested topics of interest to the selected widget; and displaying content related to the one or more suggested topics of interest on the display.

3. The method of claim 1, the method further comprising:

managing a search for content related to the one or more suggested topics of interest via the widget platform;

automatically querying multiple widgets for content related to the one or more suggested topics of interest;

displaying information about each widget that indicates available content related to the one or more suggested topics of interest on a display of the electronic device;

receiving user selection of a displayed widget;

automatically invoking the user selected widget to request content related to the one or more suggested topics of interest; and the selected widget automatically displaying content related to the one or more suggested topics of interest on the display;

wherein each widget in the widget platform is used to identify and provide information based on a suggested topic of interest without directly using a search engine or database to find content.

4. The method of claim 3 wherein querying a widget further comprises:

invoking the widget using an application programming interface and providing a suggested topic of interest to the invoked widget for determining related content.

5. The method of claim 4 wherein each invoked widget provides content source processing implemented in a widget platform, by accessing content sources in a network to fetch content related to the one or more suggested topics of interest.

6. A search facilitator system for providing access to content on an electronic device, comprising:

a processor;

a display for display of information;

a contextual recommender system for:
  obtaining metadata information related to accessed content;
  determining a current application state of an application through which the accessed content is rendered; and
  determining, based on the metadata information, the current application state and contextual information that includes information related to the accessed content, one or more suggested topics of interest in response to a request for additional content related to the accessed content;

a search facilitator for:
  receiving the one or more suggested topics of interest; and
  querying at least one dynamic packaged content source of a packaged content source platform having multiple dynamic packaged content sources for content related to the one or more suggested topics of interest by passing one or more keywords associated with the one or more suggested topics of interest to the at least one dynamic packaged content source; and a user interface for:
  displaying information about each dynamic packaged content source indicating available content related to the one or more suggested topics of interest; and
  invoking a dynamic packaged content source indicating available content related to the one or more suggested topics of interest, wherein the invoked dynamic packaged content source is rendered on the display with available content related to the one or more suggested topics of interest;

wherein each dynamic packaged content source of the packaged content source platform is associated with a corresponding description identifying a type of information of interest the dynamic packaged content source is configured to provide, such that the dynamic packaged content source is invoked only when the type of information of interest corresponds to the one or more suggested topics of interest;

wherein the contextual information further includes one or more of: information of user interest, user context, device context, content context; and wherein the contextual information is received from the contextual recommender system that seeks to provide user access to additional content related to the contextual information.

7. The system of claim 6 wherein:

the accessed content includes previously accessed content, wherein the previously accessed content represents content accessed by the device in the past;

the user interface is further configured for receiving user selection of a dynamic packaged content source indicating available content related to the one or more suggested topics of interest.

8. The system of claim 6, wherein:

the search facilitator is configured to find content related to the one or more suggested topics of interest without directly using a search engine or database to find content.

9. The system of claim 6, wherein the search facilitator comprises a search manager for querying at least one dynamic packaged content source of a packaged content source platform having multiple dynamic packaged content sources for content related to the one or more suggested topics of interest.

10. The system of claim 6, wherein the search facilitator comprises an information display manager for selectively displaying information about each dynamic packaged content source indicating available content related to the one or more suggested topics of interest on the user interface.

11. The system of claim 6, wherein each dynamic packaged content source is a widget comprising a portable, interactive package of graphics and script code that may be overlaid on the display to provide information.

12. A computer program product for providing access to content on an electronic device, said computer program product comprising:

a non-transitory computer usable medium having a computer readable program code embodied therewith, wherein the computer readable program code when executed on the computer causes the computer to:
  receive contextual information that includes information related to accessed content;
  obtain metadata information related to the accessed content;
  determine a current application state of an application through which the accessed content is rendered;
  in response to a request for additional content related to the accessed content, determine one or more suggested topics of interest based on the contextual information, the metadata information and the current application state;
  query at least one widget within a widget platform having multiple widgets for content related to the one or more suggested topics of interest by passing one or more keywords associated with the one or more suggested topics of interest to the at least one widget, wherein each widget comprises a package of graphics and script code that may be overlaid on a display to provide information;

indicate content related to the one or more suggested topics of interest available from said at least one widget;

invoke each widget that indicates available content related to the one or more suggested topics of interest; and display content related to the one or more suggested topics of interest on the display of an electronic device;

wherein each widget in the widget platform is associated with a corresponding description identifying a type of information of interest the widget is configured to provide, such that the widget is invoked only when the type of information of interest corresponds to the one or more suggested topics of interest;

wherein the contextual information further includes one or more of: information of user interest, user context, device context, content context; and wherein the contextual information is received from a contextual recommendation system that seeks to provide user access to additional content related to the contextual information.

13. The computer program product of claim 12 further comprising computer readable program code for:

displaying information about each widget that indicates available content related to the one or more suggested topics of interest on the display;

receiving user selection of a displayed widget source;

automatically invoking the selected widget to request content related to the one or more suggested topics of interest from one or more content sources by passing the one or more suggested topics of interest to the selected widget; and displaying content related to the one or more suggested topics of interest on the display;

wherein the accessed content includes previously accessed content, and wherein the previously accessed content represents content accessed by the device in the past.

14. The computer program product of claim 12, the computer program product further comprising computer readable program code for:

automatically querying multiple widgets for content related to the one or more suggested topics of interest;

displaying information about each widget that indicates available content related to the one or more suggested topics of interest on a display of the electronic device;

receiving user selection of a displayed widget;

automatically invoking the user selected widget to request content related to the one or more suggested topics of interest; and the selected widget automatically displaying content related to the one or more suggested topics of interest on the display;

wherein each widget in the widget platform is used to identify and provide information based on a suggested topic of interest without directly using a search engine or database to find content.

15. The computer program product of claim 14 wherein the computer program product further comprises computer readable program code for:

querying a widget by invoking the widget using an application programming interface and providing a suggested topic of interest to the invoked widget for determining related content.

16. The computer program product of claim 15 wherein each invoked widget provides content source processing implemented in a widget platform, by accessing content sources in a network to fetch content related to the one or more suggested topics of interest.

17. The computer program product of claim 16 wherein the computer program product further comprises computer readable program code for:

a contextual recommendation module that seeks to provide the user access to content related to the one or more suggested topics of interest; and receiving the one or more suggested topics of interest from the contextual recommendation module.

18. An electronic device for providing access to content, comprising:

a processor;

a display for display of information;

a search facilitator for:

receiving one or more suggested topics of interest determined based on metadata information related to accessed content, a current application state of an application through which the accessed content is rendered, and contextual information that includes information related to the accessed content, wherein the one or more suggested topics of interest are determined in response to a request for additional content related to the accessed content; and querying at least one dynamic packaged content source of a packaged content source platform having multiple dynamic packaged content sources for content related to the one or more suggested topics of interest by passing one or more keywords associated with the one or more suggested topics of interest to the at least one dynamic packaged content source; and a user interface for:

displaying information about each dynamic packaged content source indicating available content related to the one or more suggested topics of interest; and invoking a dynamic packaged content source indicating available content related to the one or more suggested topics of interest, wherein the invoked dynamic packaged content source is rendered on the display with available content related to the one or more suggested topics of interest:

wherein each dynamic packaged content source of the packaged content source platform is associated with a corresponding description identifying a type of information of interest the dynamic packaged content source is configured to provide, such that the dynamic packaged content source is invoked only when the type of information of interest corresponds to the one or more suggested topics of interest;

wherein the contextual information further includes one or more of: information of user interest, user context, device context, content context; and wherein the contextual information is received from a contextual recommendation system that seeks to provide user access to additional content related to the contextual information.

19. The electronic device of claim 18 wherein:

the accessed content includes previously accessed content, wherein the previously accessed content represents content accessed by the device in the past; and the user interface is further configured for receiving user selection of a dynamic packaged content source indicating available content related to the one or more suggested topics of interest.

20. The electronic device of claim 18, wherein:
the search facilitator is configured to find content related to the one or more suggested topics of interest without directly using a search engine or database to find content.

21. The electronic device of claim 18, wherein the search facilitator comprises a search manager for querying at least one dynamic packaged content source of a dynamic packaged content source platform having multiple dynamic packaged content sources for content related to the one or more suggested topics of interest.

22. The electronic device of claim 18, wherein the search facilitator comprises an information display manager for selectively displaying information about each dynamic packaged content source indicating available content related to the one or more suggested topics of interest on the user interface.

23. The electronic device of claim 18, wherein each dynamic packaged content source is a widget comprising a portable, interactive package of graphics and script code that may be overlaid on the display to provide information.

* * * * *